Nov. 20, 1956     M. WAHLSTROM     2,771,169
ROTARY WORK TABLE

Filed Oct. 6, 1953     2 Sheets-Sheet 1

INVENTOR
Magnus Wahlstrom
BY
ATTORNEY

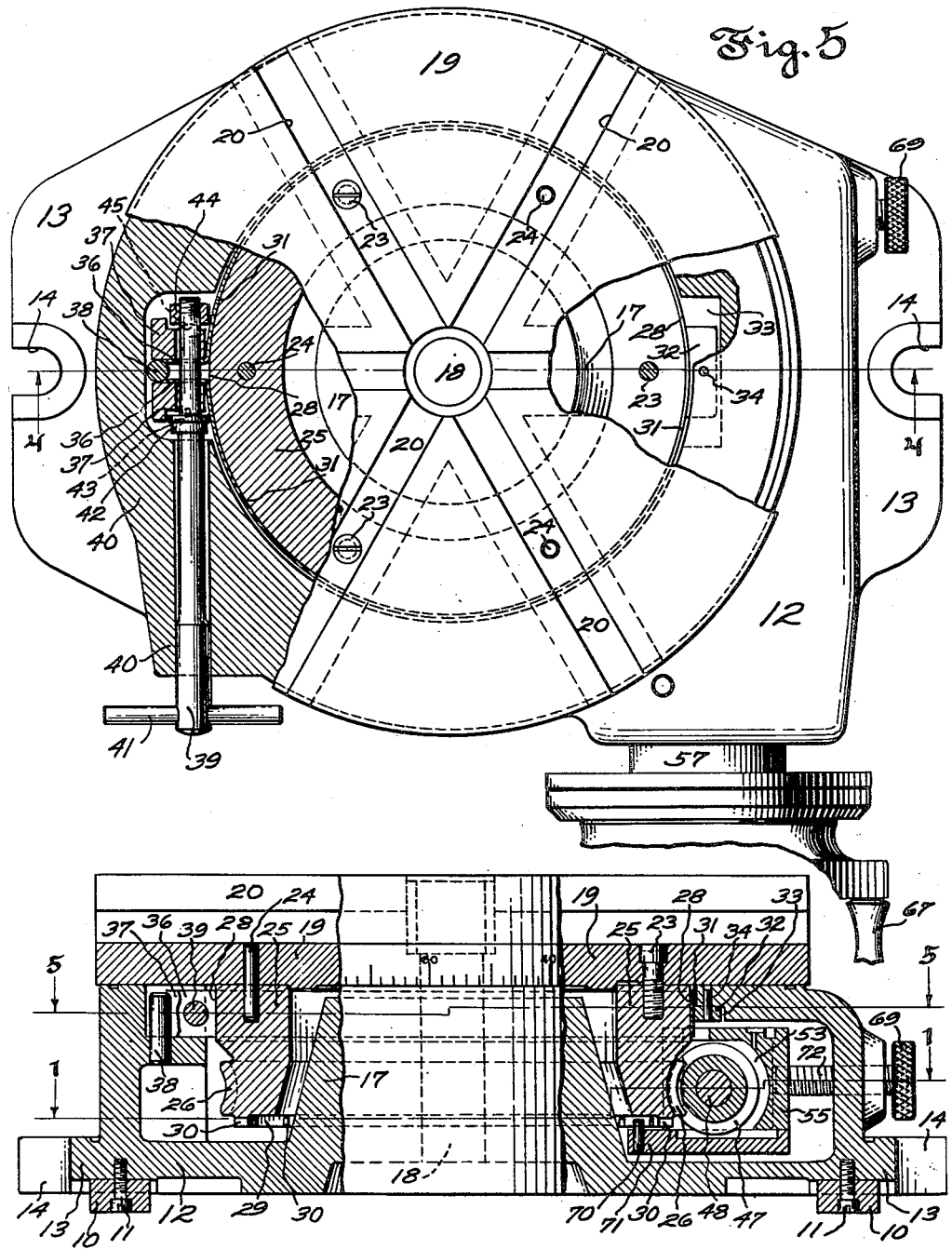

United States Patent Office 2,771,169
Patented Nov. 20, 1956

2,771,169

ROTARY WORK TABLE

Magnus Wahlstrom, Easton, Conn., assignor to The Bridgeport Machines, Inc., Bridgeport, Conn., a corporation of Connecticut Application October 6, 1953, Serial No. 384,443

20 Claims. (Cl. 192—4)

This invention relates to mechanism for controlling the position of a work holding faceplate in a rotary worktable such as may be bolted to the bed of a machine tool or elsewhere to hold work in various positions while being machined, scribed or tested.

One object of the invention is to insure against damage from clashing of the teeth of a worm and worm wheel when such teeth are restored into mesh after a period of being unmeshed for permitting free rapid manual adjustive movement of the faceplate to approximate rotary settings.

A contributory object is to prevent disturbance of the relative rotary positioning of teeth on the worm and on the worm gear from the time they are unmeshed until they are returned into mesh.

Another object is to predetermine a limited number of rotary positions of the faceplate in which the worm can be moved out of and returned into mesh with the worm wheel.

Another object is to lock the faceplate dependably against rotary displacement while the worm and worm gear are either meshed or unmeshed.

A further object is to lock the worm against movement about its axis of rotation whenever it is unmeshed from the worm gear.

A further object is to provide an adjustable stop to limit the closeness of approach of the worm into mesh with the worm gear wherefore to insure a proper running fit of the meshing gear teeth.

Still another object is to seal the interior of the worktable against entrance of dirt or foreign substance at a location where a swingable jib arm carrying the worm must project to the exterior of the worktable to make the worm shaft accessible for manual operation.

The foregoing and related objects of the invention will appear in greater particular in the following description of a successfully operative embodiment of the invention having reference to the appended drawings wherein:

Fig. 4 is a view taken in section on the plane 4—4 in Figs. 1 and 5, looking in the direction of the arrows.

Fig. 5 is a plan view showing the faceplate partially broken away to expose an underlying brake mechanism shown partly in section on the planes 5—5 in Fig. 4 for maintaining the setting of the faceplate in adjusted rotary positions.

Figures 1, 2, 3:
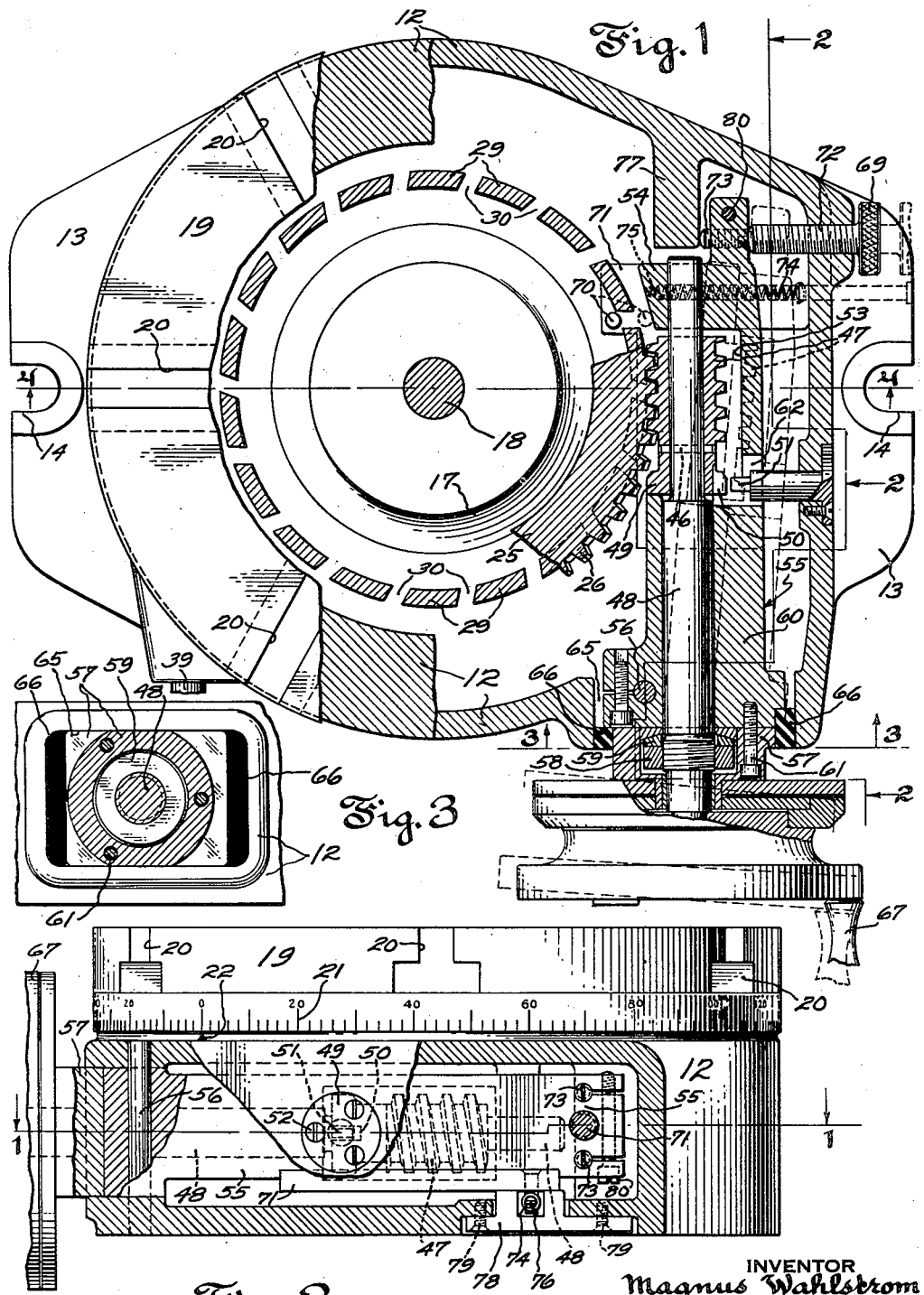
Fig. 1 is a plan view of a rotary worktable embodying the present invention having its rotary faceplate partially broken away to expose underlying gear mechanism shown partly in section on the planes 1—1 in Figs. 2 and 4 for adjusting the faceplate to various rotary positions.
Fig. 2 is a view taken partly in section on the planes 2—2 in Fig. 1, looking in the direction of the arrows.
Fig. 3 is a fragmentary view taken in section on the plane 3—3 in Fig. 1, looking in the direction of the arrows.

The shallow base 12 of the worktable is a hollow casting housing an annular chamber 15 having foot pads 10 secured thereto by screws 11 and having side flanges 13 notched at 14 to accommodate holding bolts (not shown) by means of which the worktable can be fastened down in usual manner upon the bed of a machine tool such as a milling machine, or elsewhere.

Base 12 is constructed with a central vertical bearing 17 in which is journaled the depending trunnion 18 of a rotary faceplate 19 having conventional T-shaped grooves 20 to receive the heads of bolts (not shown) adapted to clamp work pieces against the surface of the faceplate in usual manner.

Fig. 4 shows that the faceplate 19 has secured to it by bolts 23 and dowel pins 24 a depending annulus or ring flange 25 about whose entire periphery there are driven teeth 26 that form a worm gear. In the bottom rim 29 of ring flange 25, at intervals say of 20 degrees, there are escapement notches 30 as shown in Figs. 1 and 4. Rim 29 thus serves as an escapement controlling barrier for purposes hereinafter appearing.

The periphery of ring flange 25 above gear teeth 26 is cylindrical and smoothly finished to serve as a brake drum 28 that is encompassed, sometimes loosely and sometimes tightly, by a thin flexible brake band 31 carrying an anchorage lug 32 midway its circular length as shown in Figs. 4 and 5. Lug 32 is pivotally anchored in a recess 33 of the base chamber 15 by means of a hinge pin 34, fixed in the roof wall of the base casting.

The free ends 36 of brake band 31 on the diametrically opposite side of annulus 25 are bent into separated parallel relation and carry welded thereto the respective terminal blocks 37. The mutually facing outer margins of these blocks contact with respectively opposite sides of an upstanding fulcrum abutment afforded by post 38 fixed in the base casting 12 and intervening between the blocks 37 for contact thereby. Together with band ends 36, blocks 37 are penetrated by the shank of a tightening key 39 which has a rotary bearing 40 in the base casting 12 and which extends through aligned clearance holes in the blocks 37 and the band ends 36. Key 39 has a T-handle 41 outside of the worktable. A shoulder 42 on the shank of key 39 rotatably bears against a rounded projection or rocker bump 43 on one side of a terminal block 37 of the brake band, and the key shank is threaded to receive a nut 44 that bears against a similar rounded projection or rocker bump 45 on the other terminal block 37. Nut 44 is prevented from turning because of a sufficiently close fit of its flat sides in the corner formed by the recessed terminal block and the contiguous outer surface of the brake band.

When key 39 is turned in nut 44 it draws the blocks 37 toward each other with freedom to rock relatively on block projections 43 and 45, respectively, while the blocks are in contact with opposite sides of frame post 38 and able to rock thereagainst. Thus effective leverage is exerted, with respect to this post serving as a fulcrum, for forcing the brake band 31 into tightly and well equalized hugging relationship to the brake drum 28. This dependably stays the rotary faceplate from being turned as long as the brake band remains tightened. The brake band can thus be tightened whether or not the worm wheel 25 is in mesh with its driving worm 47.

Worm 47 occupies a hollow 53 in the structure of a gear shifting carrier which might have various types of reciprocative gear shifting movement but herein is shown as a swingable jib arm 55. Worm 47 is fixed on a drive shaft 48 by pin 46. Integral with this worm there is a hub 49 radially presenting a locking notch 50 affording dogging shoulders in fixed relation to the worm and which as best shown in Fig. 1 is capable at times of swinging into engagement with the inner end of a frame stationed stop stud or interceptor 51. Thus stud 51 on occasion prevents turning of worm 47 about the axis of shaft 48. Screws 52 removably hold stud 51 mounted in the side wall of the base. Stop stud 51 projects freely through a clearance opening 62 in the side wall of jib arm 55.

The inner end of the shaft 48 is journaled in a bearing 54 formed by the inner end of jib arm 55. This worm carrying jib arm is hinged to base 12 on a pivot pin 56. It is permitted sufficient swinging movement between its full line and broken line positions in Fig. 1 to shift worm 47 into and out of mesh with worm wheel 26.

The pivotally anchored end of jib arm 55 carries a cap 57 secured thereon by screws 61 which houses a retaining nut 58 on shaft 48, and a thrust washer 59. Thrust for shaft 48 in the opposite or outward axial direction is afforded by contact between the end of worm hub 49 and the outer bearing 60 on the jib arm structure. Substantial lateral spaces between cap 57 and an overwidth aperture 65 in the side wall of base casting 12, as shown in Fig. 3, are filled with easily compressible bodies 66 of resilient packing material such as rubber. This precludes entrance of dust to the interior of the base. The packing will yield readily when slightly squeezed by the few degrees of swinging movement performed by arm 55 between its full line and broken line positions in Fig. 1. On its outer end which protrudes from cap 57 shaft 48 carries a single wheel handle 67 both for turning shaft 48 and worm 47 and for swinging the jib arm.

By the principles of this invention the swinging movement of jib arm 55 in either direction between its broken and full line positions in Fig. 1 can take place only when the faceplate 19, and hence one or another of the aforesaid notches 30, occupies some one of definite predetermined positions in relation to base 12. Only in such positions is there permitted the passing through such notches of a check or escape pin 70 that upstands from a lateral flange 71 carried fixedly by the swingable jib arm 55. See Figs. 1 and 4.

While faceplate 19 is being turned by means of handle 67 to finely adjust its rotary setting, worm 47 is kept fully in mesh with worm gear 26 by means of a keeper screw 72 whose knurled head 69 serves as a thumb knob outside the worktable. The closeness of mesh of the teeth of the worm and worm gear is adjustably limited by two stop screws 73 that thread through the jib arm 55 and abut against a stop lug 77 projecting internally of the base casting. Stop screws 73 are fastened against accidental loosening by a lock screw 80 that draws together the split end portion of the jib arm thus to exert a holding squeeze on stop screws 73.

Jib arm 55 is normally urged clockwise, or toward the right in Fig. 3, by the constant pull of a spring coil 74 whose inner end is anchored to a pin 75 depending from arm 55, and whose outer end is anchored to the end of a frame stud 76 that is adjustably and removably carried by base 12 within the channel of a spring bed 78 that is removably attached to the base by screws 79.

In operation the faceplate 19 is free to be whirled to convenient positions when setting up the work thereon so long as brake band 31 remains loosened and worm 47 is swung out of mesh with driven teeth 26. Under these circumstances the brake tightening key 39 is unscrewed by turning key handle 41 counterclockwise in Fig. 4 and jib arm is biased and retained by spring 74 in its broken line position in Fig. 1.

Now without disturbing the unmeshed position of worm 47 brake band 31 can be tightened against brakedrum 38 by clockwise turning of key 39 in Fig. 4 to lock the faceplate in fixed position.

However at no time can worm 47 be shifted into mesh with driven teeth 26 for the purpose of a measured degree of turning of the faceplate through this disconnectable gear drive unless the faceplate occupies accurately some predetermined rotary position such as corresponds say to a registration of the degree graduations 21 that are marked at twenty-degree intervals in Fig. 2 with one or more base carried index marks 22 with which graduations 21 may register as usual. Only in each of these particular rotary positions of the faceplate will the check 70 be able to pass through one of the notches 30 shown in Figs. 1 and 4.

Now since the number of equally spaced driven gear teeth 47 in a complete circle is an even multiple of the number of equally spaced escape notches 30 in a complete circle, it follows that in each of the said faceplate positions some group of the driven teeth 26 will always be found in accurately the same relation to the meshing and unmeshing path of shifting movement of their driving worm 47. Hence it is assured that when worm 47 is shifted into mesh with driven teeth 26 the teeth of the worm will find the driven teeth 26 positioned exactly as when last unmeshed therefrom. Consequently there can be no clashing of teeth upon restoring the worm into mesh unless the worm inself has altered its own rotary position since last being thrown out of mesh. But this has been made impossible because the worm cannot leave mesh with the driven gear teeth without its dogging shoulders shifting into rotary locking engagement with the frame stationed interceptor 51. Thus at no time can there take place a restoring of gear mesh unless the mating gear teeth are mutually positioned to mate smoothly without clashing or damage to the teeth.

The closeness with which the worm can approach the driven gear teeth is determined by selective setting of stop screws 73 as to how far to the left they shall project from the jib arm 55 in Fig. 1. The jib arm may be forced and/or held in its full line gear meshing position in Fig. 1 by screwing in the keeper screw 72 until stop screws 73, 73 are brought firmly against the stop lug 77 of the base casting.

The wheel of handle 67 may carry graduations on its outermost face in usual manner to move in register with an index marker (not shown) supported on the cap 57 of the jib arm 55 outside the base whereby degrees and minutes of faceplate turning movement occasioned by turning of handle 67 will be indicated with great fineness and precision. Thus suitable marking can be placed on such wheel graduations to indicate to the operator the rotary position of the worm notch 50 that enables it to lock with interceptor 51.

The appended claims are directed to and intended to cover all mechanical equivalents of parts and arrangement herein disclosed that come within a broad interpretation of the terms by which such parts and arrangements are referred to in the following claims.

I claim:

1. Mechanism inclusive of disconnectable gearing for setting and holding an angularly adjustable rotary member in selective rotary positions, comprising gear tooth clash preventive interlocking devices including in combination with the rotary member and a base structure rotatably supporting the same, driven gear teeth connected to transmit rotary movement to said member when impelled, a drive disconnecting gear carrier mounted on said base structure in shiftable relation thereto, a driving gear rotatably mounted on said carrier in a manner to be shifted body therewith into and out of driving mesh with said driven teeth, a check connected to be moved in a predetermined path by gear shifting movement of said gear carrier, and a barrier connected to be impelled into and out of said path of check movement by rotary movement of said member to and from at least one predetermined position thereof relative to said base structure, together with a brake drum carried by said member in fixed relation thereto, a brake band anchored on said base structure encompassing said drum at least in part, and means to tighten and loosen said band with respect to said drum when said driven teeth and said driving gear are either in mesh or out of mesh.

2. Mechanism as defined in claim 1, in which the said base structure is hollow and houses the said gear teeth and the said driving gear along with the said brake drum and the said brake band.

3. Mechanism as defined in claim 1, in which the said brake drum comprises a flange projecting from the said rotary member and carrying the said driven teeth.

4. Mechanism as defined in claim 1, in which the said brake drum comprises a flange projecting from the said rotary member and forming the said barrier.

5. Mechanism as defined in claim 1, in which the said brake drum comprises a flange projecting from the said rotary member carrying the said driven teeth and also forming the said barrier.

6. Mechanism as defined in claim 1, in which the said means to tighten and loosen the said brake band comprises a threaded band tightening key penetrating separated ends of said band and presenting a turn handle in outboard relation to the said base structure.

7. Mechanism as defined in claim 6, together with a fulcrum affording abutment stationed on the said base structure in position to contact with and intervene between the said separated ends of the said brake band.

8. Mechanism as defined in claim 7, in which the said key extends between the said fulcrum member and the said brake drum.

9. Mechanism as defined in claim 7, in which the said key is journaled in the said base structure.

10. Mechanism inclusive of disconnectable gearing for setting and holding an angularly adjustable rotary member in selective rotary positions, comprising gear tooth clash preventive interlocking devices including in combination with the rotary member and a base structure rotatably supporting the same, driven gear teeth connected to transmit rotary movement to said member when impelled, a drive disconnecting gear carrier mounted on said base structure in shiftable relation thereto, a driving gear rotatably mounted on said carrier in a manner to be shifted bodily therewith into and out of driving mesh with said driven teeth, a check connected to be moved in a predetermined path by gear shifting movement of said gear carrier, and a barrier connected to be impelled into and out of said path of check movement by rotary movement of said member to and from at least one predetermined position thereof relative to said base structure.

11. Mechanism as defined in claim 10, in which the said rotary member is a work carrying table flanking the said base structure and having a projecting trunnion journaled in the latter.

12. Mechanism as defined in claim 10, in which the said base structure is hollow and forms a chamber housing the said gear teeth and driving gear together with the said check and barrier.

13. Mechanism as defined in claim 10, in which the said gear carrier comprises a jib arm swingably mounted on the said base structure.

14. Mechanism as defined in claim 10, in which the said base structure houses a chamber occupied by the said driving gear and bordered by a side wall of said structure having an aperture, and the said gear carrier is an elongate jib arm swingably mounted on said base structure and extending through said aperture, together with a shaft on which said driving gear is fixed extending lengthwise with said jib arm through said aperture and journaled in said arm, and a single handle for turning said shaft and swinging said jib arm fixed on said shaft outside of said base structure and free for both bodily movement relative to said base structure and rotary movement relative to said jib arm.

15. Mechanism as defined in claim 10, in which the said check is fixed on the said jib arm and projects therefrom to traverse its said path of travel.

16. Mechanism as defined in claim 10, in which the said barrier is a notched flange projecting fixedly from the said rotary member into the said path of travel of the said check.

17. Mechanism as defined in claim 10, together with dogging shoulders fixed to the said gear, and an interceptor stationed on the said base structure in position to interlock with said dogging shoulders in a manner to restrain said gear against rotation about its own axis when said gear is bodily shifted by swinging movement of the said carrier to a position out of mesh with the said driven gear teeth.

18. Mechanism as defined in claim 10, in which the said gear carrier comprises a jib arm carrying the said check and swingably mounted on the said base structure, and the said barrier comprises a flange projecting fixedly from the said rotary member into the said path of said check, together with dogging shoulders on the said gear, and an interceptor stationed on the said base structure in position to interlock with said dogging shoulders in a manner to restrain said gear against rotation about its own axis when said gear is bodily shifted by swinging movement of the said carrier to a position out of mesh with the said driven gear teeth.

19. Mechanism as defined in claim 10, in which the said base structure houses a chamber occupied by the said driving gear and bordered by a side wall of said structure having an aperture, and the said gear carrier is a jib arm swingably mounted on said base structure and extending through said aperture, together with a handle supported by said jib arm outside of said wall for imparting swinging movement to said jib arm within said hollow thereby to shift said gear into and out of mesh with the said driven gear teeth.

20. Mechanism as defined in claim 19, in which the said jib arm is substantially smaller in cross section than the said aperture, together with compressible resilient packing material interposed between said jib arm and the wall surface bordering said aperture.

References Cited in the file of this patent

UNITED STATES PATENTS

| | | |
|---|---|---|
| 1,100,522 | Brown | June 16, 1914 |
| 1,262,235 | Murray | Apr. 9, 1918 |
| 1,396,302 | Wagner | Nov. 8, 1921 |
| 2,570,444 | Henkel | Oct. 9, 1951 |

FOREIGN PATENTS

| | | |
|---|---|---|
| 128,473 | Great Britain | June 26, 1919 |